INVENTORS
Hans Awender
Erhard Becker &
Johann Barth

INVENTORS
Hans Awender
Erhard Becker &
Johann Barth

INVENTORS
Hans Awender
Erhard Becker &
Johann Barth

BY George H Spencer

ATTORNEY

INVENTORS
Hans Awender
Erhard Becker &
Johann Barth

3,232,009
MATERIAL WORKING PROCESS AND
APPARATUS
Hans Awender, Berlin-Nikolassee, Erhard Becker, Berlin-Lichtenrade, and Johann Barth, Berlin-Lichterfelde, Germany, assignors to Telefunken Patentverwertungs-G.m.b.H., Ulm, Danube, Germany
Filed July 24, 1962, Ser. No. 212,760
Claims priority, application Germany, July 24, 1961,
T 20,496
5 Claims. (Cl. 51—73)

The present invention relates generally to a process and apparatus for sawing material, and, more particularly, to the manufacture of preferably short sections of material formed by using a saw having an annular blade for cutting straight or oblique sections wherein the workpiece is fed into the opening of the annular saw by means of a work holder which clamps the workpiece.

In a known mass production method for cutting articles, such as chain links and the like, for forming sections of equal lengths using annular saws, the workpiece is cut by a relatively slowly rotating annular saw blade having teeth on the inner periphery thereof. In apparatus for performing this known method, the workpiece is fed along a horizontal axis and a hollow cone carrying the saw blade rotates about this axis. The workpiece is cut when the rotating hollow cone is placed into sawing operation and is gradually lowered onto the workpiece and cuts therethrough because of the weight of the cone. In order to cut the workpiece at another position, the hollow body must be manually moved upwardly and again be placed onto the workpiece so that it can then cut thereinto due to its own weight.

Recently, annular saws which rotate rapidly and have cutting edges formed of diamond dust sintered onto the inner periphery thereof, have been used for the manufacture of platelets for semiconductor and piezoelectric crystals, as well as platelets of ceramic. These saws also rotate about horizontal axes. However, with such saws the material can only be cut in the form of a comb and, therefore, after the sawing operation is completed, the platelets must be broken away from the comb base. It is practically impossible to saw off these platelets because they would then fall into the rotating saw blade clamping head and would be broken or get otherwise damaged and possibly be hurled about therein. Because of these loose particles in the saw blade head, some type of unbalance may be created due to the rapid rotation of the head, and such an unbalance would endanger not only the saw blade head but the entire sawing device.

Therefore, in order to be capable of carrying out precision cutting with the aid of this type of sawing method the machine would have to be shut off after each cutting step or the workpiece be displaced from its sawing position after each cutting step. Furthermore, there is also the possibility that there will be some type of angular error in a crystal platelet and which, after being broken off, will be provided with an angular projection on its surface, which must then be ground away or otherwise removed.

Thus, in the two above-mentioned processes as well as with the annular saws which are used for performing these methods, only an intermittent type of operation can be used, with the machine being shut off between working phases.

With these defects of the prior art in mind, it is a main object of the present invention to provide an improved process as well as apparatus for performing continuous cutting of material.

Another object of this invention is to provide for very accurate cutting of material and especially of very short sections thereof.

A further object of the invention is to perform cutting operations as indicated above under controllable conditions and which may be used for mass production.

Still a further object of the instant invention is to provide a cutting method and apparatus for use with sensitive materials and also those which are brittle, such as, for example, semiconductor crystals or quartz crystals and ceramic blocks.

These objects and others ancillary thereto are accomplished according to preferred embodiments of the invention wherein a hollow body is provided for carrying an annular saw blade, and they rotate together coaxially about a fixed and vertically positioned hollow sleeve. The sections which are cut off from the workpiece are flushed from the sleeve, this being done preferably and substantially by means of a liquid. The liquid is not only used for flushing the sections out of the sleeve but also for lubricating and cooling of the saw blade during the cutting operation.

Also, the hollow body and the sleeve are provided with a plurality of separating devices for separating from the sections which are being manufactured the soiled or contaminated lubricating agent and a spray or mist of this agent. The process of the present invetnion is advantageous in that, in distinction to the known processes, the sections which are cut may be removed immediately for further processing without the need to stop the saw or to endanger the saw.

Additional objects and advantages of the present invention will become apparent upon consideration of the following description when taken in conjunction with the accompanying drawings in which.

Figure 1:
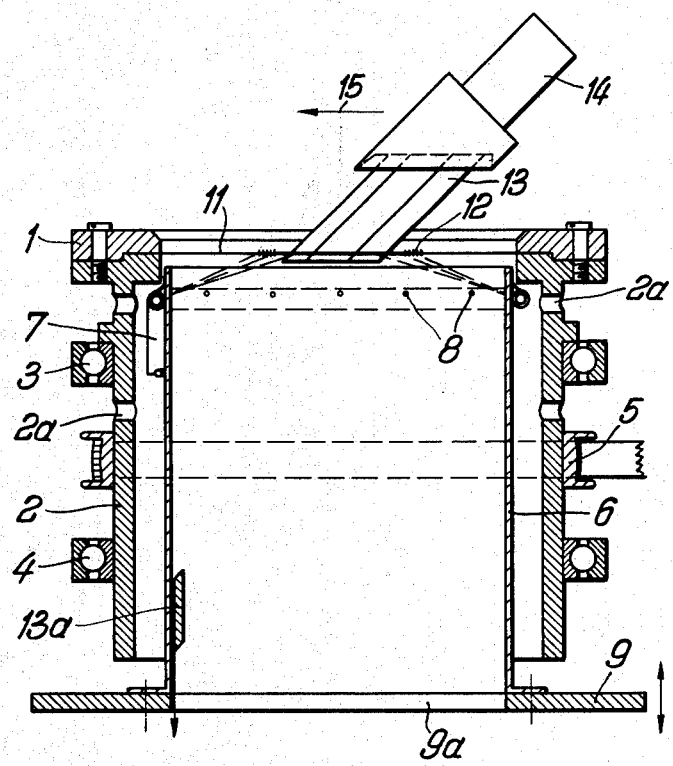
FIGURE 1 is a schematic vertical sectional view through a rotatable hollow body and a fixed sleeve wherein these members are cylindrical in shape.

With more particular reference to the drawings, the principle of the present invention will be explained in more detail. In the embodiment illustrated in FIGURE 1, a hollow body 2 is provided and is rotatable about a vertical axis. The annular saw blade 11 is fastened to the upper end of the hollow body by means of clamping ring 1. The saw blade 11 comprises a thin sheet of metal having an inner peripheral edge provided with a border of small diamonds 12, in a manner which is known per se, in order to provide a diamond cutting surface. A workpiece 13 is disposed within the circular opening in the blade 11 and is movable in the direction of arrow 15, and fixedly held in the workpiece holder 14. Workpiece 13 is inserted into the opening in the blade from above.

In this simplest form illustrated in FIGURE 1, the hollow body 2 is cylindrical in shape and is supported by ball bearings 3 and 4. A drive belt pulley 5 having flanges thereon is mounted on the hollow body at substantially the middle portion thereof. A V-belt or the like connects the pulley with a power driving device in order to rotate the hollow body. Preferably, the hollow body is provided with radial bores 2a formed in the upper end thereof for a purpose which will be described in further detail below.

Figure 2:
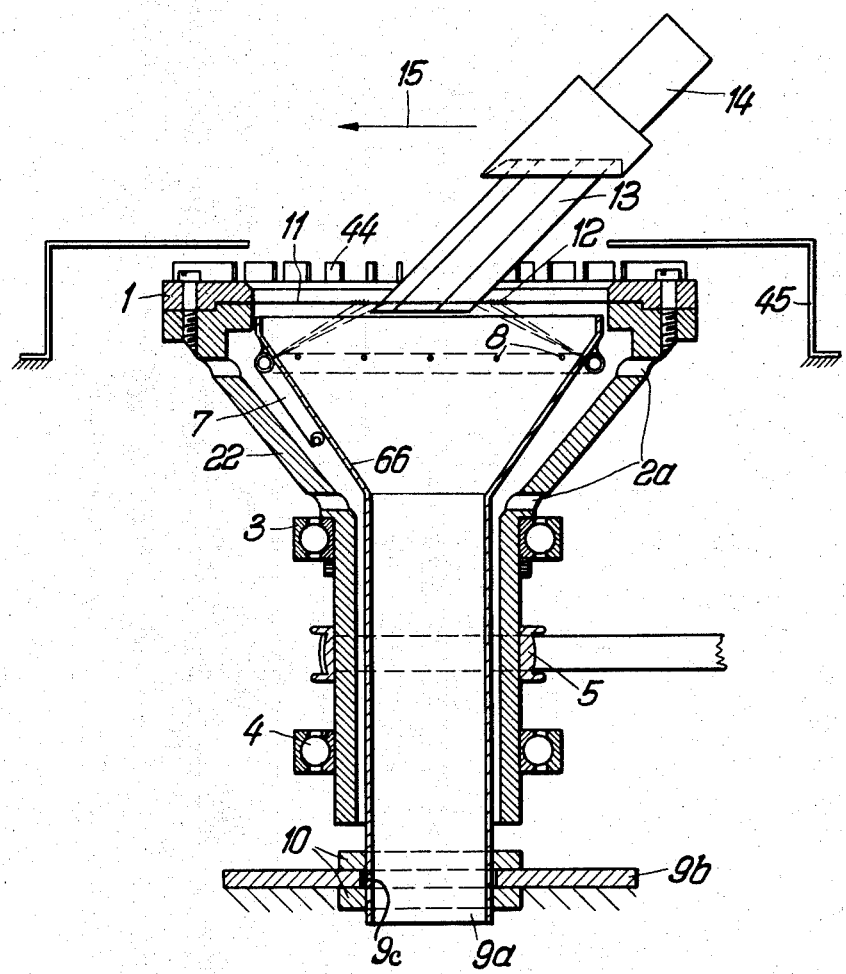
FIGURE 2 is a schematic vertical sectional view similar to FIGURE 1 wherein the hollow body and sleeve are each in the form of a funnel.

Radially or tangentially directed inclined metal plates 44 may be mounted to the clamping ring 1 and a hood 45 is provided above these plates 44, as more clearly indicated in FIGURE 2. In FIGURE 2 it should be noted that the structure is generally the same as that of FIGURE 1 but that the sleeve and hollow body are both of funnel form.

Interiorly of hollow body 2 is a sleeve 6 mounted coaxially therewith and which is stationary when the annular saw is in operation. The lower end of the sleeve 6 is mounted to a vertically movable carrier or supporting plate 9 provided with an opening 9a which coincides with the hollow portion of sleeve 6, as indicated in FIGURE 1.

The sleeve 6 has an approximately cylindrical shape similar to the hollow body 2. The lengths of hollow body 2 and sleeve 6 are substantially equal and are longer in dimension than both their diameters. The upper end of the sleeve is provided with bores 8 distributed over the circumferential surface thereof and directed toward the saw blade. A lubricating agent feed line 17 of annular shape is disposed upon the sleeve about the bores.

With more particular reference to FIGURE 2, the hollow body 22 and the sleeve 66 are of funnel form, as mentioned above. In this embodiment, the supporting plate 9b is mounted to be stationary in contradistinction to the movable support plate of the embodiment of FIGURE 1. An opening 9c is provided in supporting plate 9b and the lower end of the sleeve 66 extends downwardly through this opening and is removably secured to plate 9b by means of adjusting nuts 10. To provide a secure mounting support, and to provide for guidance of the sleeve, the nuts 10 are of sturdy construction. The remainder of the construction of the annular saw in this embodiment corresponds to the embodiment of FIGURE 1.

Figure 3:
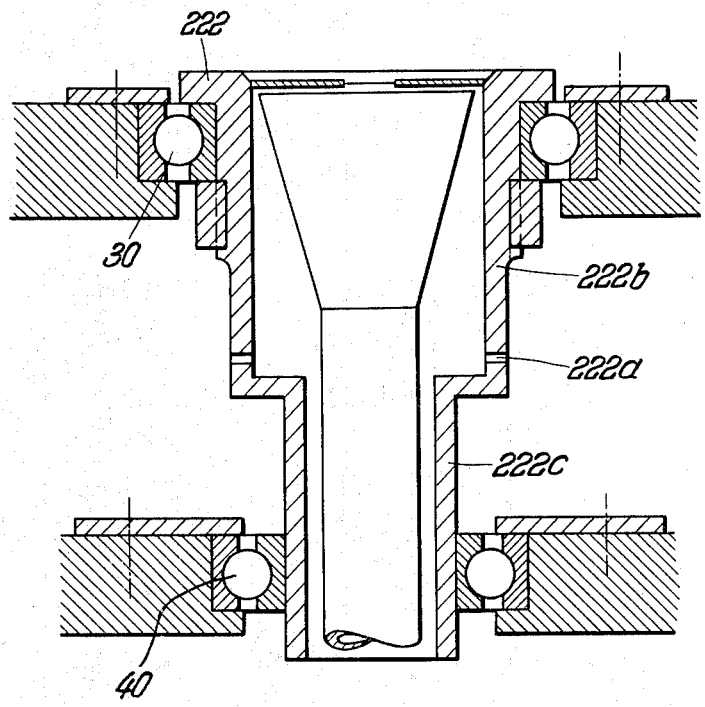
FIGURE 3 is a schematic vertical view, partially in section, of a further embodiment of a rotatable hollow body and indicating one type of bearing support therefor.

With more particular reference to FIGURE 3, a further embodiment of the hollow body is illustrated and is identified as 222. Although the body is of generally cylindrical shape, it is of stepped cylindrical shape with its upper portion 222b having a greater diameter than its lower portion 222c. This hollow body comprises one or several portions and the portions 222b and 222c may also be removably connected with each other. Also, the bearing arrangement shown in this figure is a preferred embodiment which has been successfully tested for use with the hollow bodies 2, 22, and 222. Radial bores 222a are provided in the upper portion 222b for a purpose which will be further explained below. As is shown in FIGURE 3, bearing 30 is a fixed or stationary bearing and bearing 40 is a sliding bearing.

These bearings correspond to the bearings 3 and 4 of the embodiments of FIGURES 1 and 2. The construction of the sleeve may be the same as that of the embodiment of FIGURE 2 in this particular embodiment of the invention.

Figure 4:
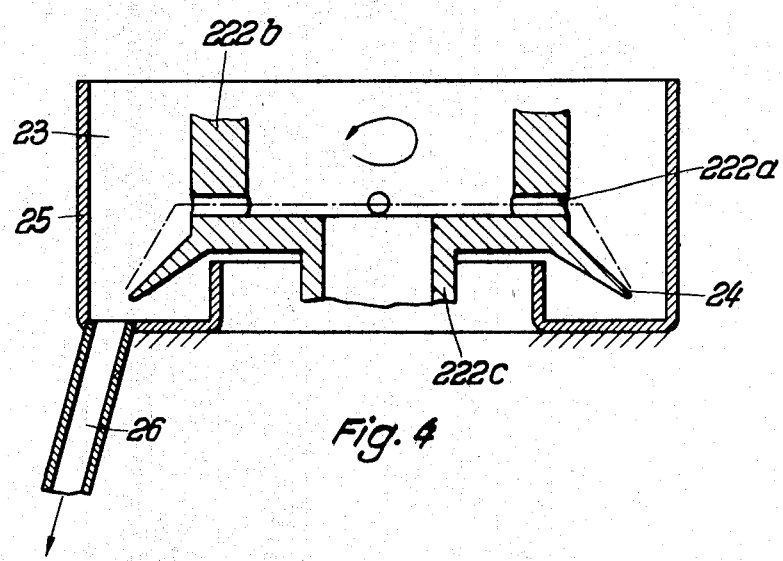
FIGURE 4 is a more detailed schematic vertical sectional view of one type of device for separating lubricating agent from a section which has been cut.

With more particular reference to FIGURE 4, a separating or collecting device 23 for the saw slurry separated in the upper portion of hollow body 222 is shown. This device includes a ratchet wheel 24 formed on the underside of upper portion 222b of the hollow body. This wheel tapers outwardly and below radial bores 222a and extends downwardly into a trough 25 having an outlet drain 26 for the saw slurry.

Figure 5:
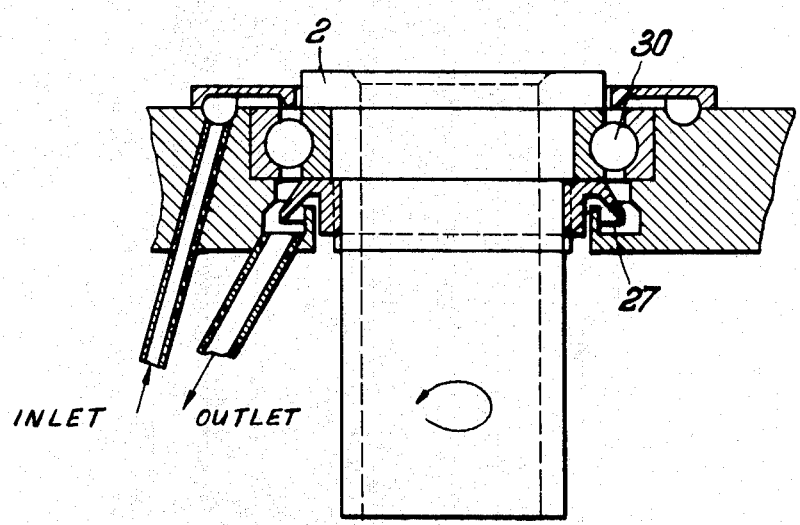
FIGURE 5 is a schematic vertical sectional view of another type of device for separating lubricating agent from the sections which have been cut.

With more particular reference to FIGURE 5, similar types of collecting devices as discussed in connection with the embodiment of FIGURE 4 may also be provided at the bearings 3, 4, 30, and 40. However, they are suitably adapted for use in the vicinity of a bearing in order to aid in the lubrication thereof. In such embodiments the collection trough 27 is provided and an outlet drain is connected therewith. Furthermore, an inlet is provided in order to introduce the oil into the vicinity of the bearing.

Figure 6:
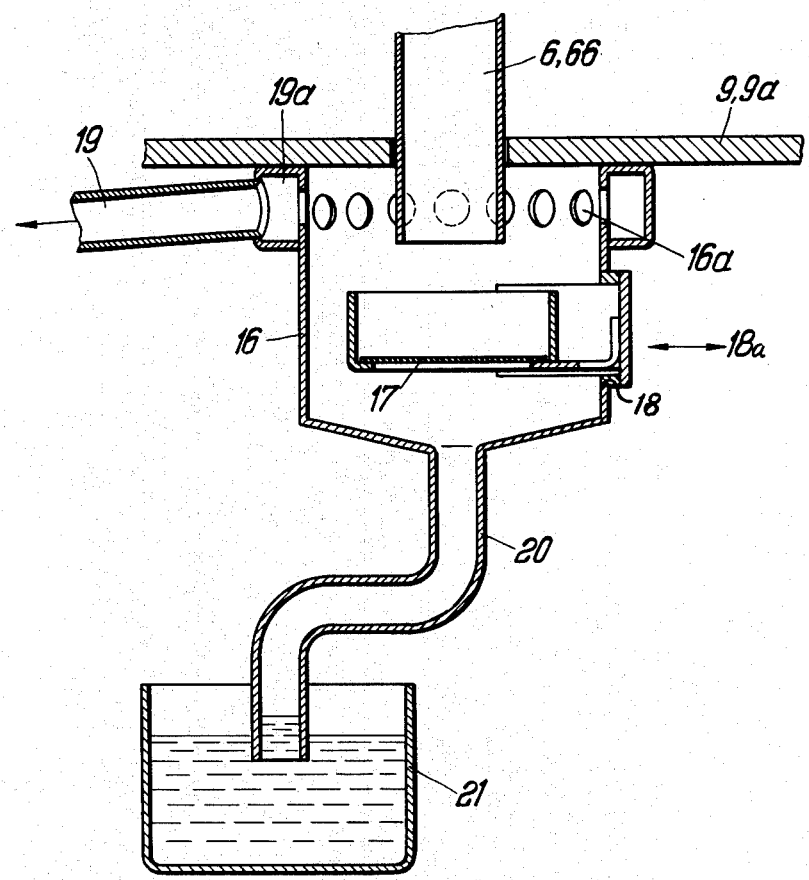
FIGURE 6 is a schematic vertical sectional view of the device for removing the cut sections and indicating further separating devices for separating lubricating and/or rinsing or flushing agent.

With more particular reference to FIGURE 6, the lower portion of the annular saw apparatus is illustrated which is connected to and closes off the sleeve 6 or 66 of the embodiments of FIGURES 1 and 2, respectively. This lower section of the device includes a separating device 16 which is provided with a substantially larger cross-sectional dimension than the sleeve 6 or 66. A collecting trough or container 17 is provided below the sleeve and is disposed within the separating device 16 and serves to collect the sections of material which are manufactured or cut off to the correct size in accordance with the present invention. The bottom of trough 17 is perforated as a sieve or strainer and it is provided with a handle and may be moved in the direction of the double arrow 18a through the opening 18.

The separating device is provided with radial bores 16a in the upper end thereof and these are distributed along the circumference thereof. An annular pipeline 19a is disposed about these bores and is connected with a conduit 19 of a suction device. The bottom of separating device 16 is of funnel like form and is provided with a lubricating agent outlet pipe 20 leading to a collecting container 21.

In order to illustrate the principle of the present invention more clearly, the operation of the disclosed apparatus and the method of the instant invention will now be set forth. The annular saw is first set into rotation, which is preferably rapid, by means of a power drive unit connected with a V-belt or the like which is disposed about the pulley 5 and which rotates hollow body 2 (or 22 or 222) about the sleeve 6 which is stationary while the device is in operation.

After a certain period of time, the device is ready for the cutting operation and workpiece 13 is moved from the opening of the saw blade 11 in the direction of arrow 15 by means of a crossfeed device (not shown) so that the workpiece may be cut by the diamond cutting edge 12. A lubricating agent which is preferably oil is forced through the radial bores 8 via the feed line 7 and the oil comes into contact with the rotating saw blade from a downwardly and inclined position and the saw blade is thus lubricated.

The saw dust which occurs first is contacted by the oil and a saw slurry is formed which is forced along the underside of the saw blade 11 in the direction of the inner surface of the stationary sleeve 6 by means of centrifugal force.

The sleeve is adjusted so that its upper end is very close to the rotating saw blade and such an adjustment may be performed, for example, by means of the removable adjusting nuts 10. The minute air gap or slit which is provided between the upper end of the sleeve and the lower end of the rotating saw blade is effective as a first separating means which is provided by an adjustment in such a manner that the saw slurry may just pass through the slit or gap. The cut off section 13a which is removed during the progressive movement of the workpiece 13 will move radially out of the opening in blade 11 on the underside of the saw and will then be flushed downwardly along the inner surface of the sleeve essentially by means of the streams or jets of oil passing through the radial bores 8.

In those cases where it is desired to manufacture longer sections 13a, it is preferable to use a funnel shaped sleeve 66 in the hollow body. In this event, sections 13a may fall into the sleeve due to their own weight. However, during their falling they are collected by the inner surface of the funnel shaped portion and are contacted by the oil running down the surfaces thereof and, by means of the oil, are flushed downwardly and out of the sleeve.

The downwardly moving cut off sections finally arrive at the collecting trough 17, disposed in the second separating device 16 which closes off the sleeve at the bottom hereof. The bottom of this container is perforated and it is in the form of a sieve and thereby the oil is separated from the sections 13a and runs along the funnel shaped bottom of the device 16 through pipe 20 and into collecting container 21. The oil mist which occurs in the separating device is drawn off by means of radial bores 16a and annular pipe 19a by means of a suction device (the details of which are not shown) connected thereto by suction pipe 19.

The mode of operation of the annular saw may be further improved by utilizing the embodiments of FIGURES 3 through 6. The metal plates 44 which are only shown in the embodiment of FIGURE 2, but which may be used on any of the embodiments thereof, are mounted radially or tangentially on the clamping ring 1 and provide a suction power for removing the oil mist which emanates from the saw opening into the space enclosed by the hood 45.

Surprisingly, in this connection it was found that the separating processes can be very substantially improved by using the radial bores 2a which are provided in the hollow body. The suction power is created when the hollow body is rotating and aids the flushing effect of the lubricating agent to a great degree.

If there are heavier or greater quantities of saw slurry, then the stepped cylindrical body 222 may be used. As indicated in FIGURE 4, when using this body 222 it is very easy and particularly advantageous to use a further separating device including the oil collecting device 23 connected at the transition point between the larger diameter upper portion 222b and the narrower diameter lower portion 222c. The oil slurry emanating from radial bores 222a is forced outwardly along the ratchet wheel 24 because of centrifugal force and runs downwardly into the oil trough 25. There it is collected and discharged through outlet 26. Oil collector trough 27 also has a ratchet wheel and corresponds to the oil collecting device 23, and it may be mounted at the bearings 3, 4, 30, and 40, and these also may be kept clean for a longer period of time (see FIGURE 5).

Due to the above-mentioned embodiments and measures, a further advantage of the present invention is that the annular saw device may be run for a longer period of time without special maintenance or servicing, and also that the sections which are obtained by the process and the apparatus according to the present invention are not soiled but are only somewhat covered by oil and therefore provide an intermediate product which can be rapidly processed further.

Figure 7:
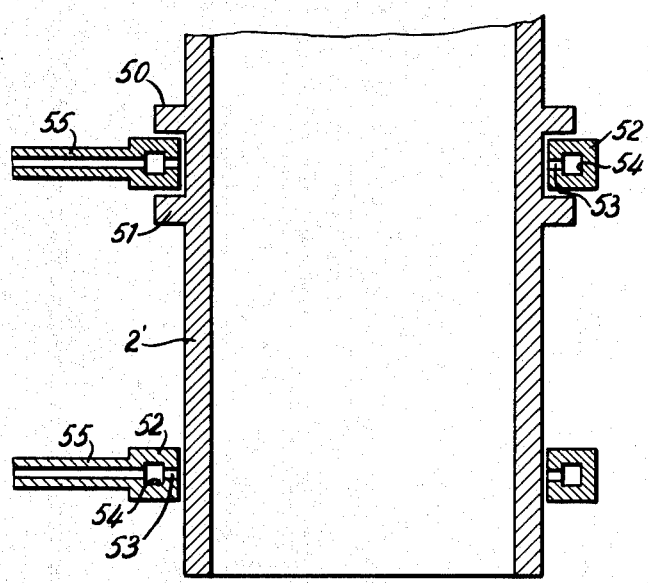
FIGURE 7 is a schematic vertical sectional view of a bearing for the rotatable hollow body.

With more particular reference to FIGURE 7, an air cushion bearing arrangement for the hollow rotatable body is illustrated. The hollow rotatable body 2′ is provided with two radially extending circumferential flanges 50 and 51 which are spaced axially from each other. An annular conduit 52 is provided between these flanges and encircles the body 2′ and the inner surface of which is a little greater in diameter than the outer surface of the hollow body. A single continuous or a plurality of slots 53 are formed in the inwardly facing surface of the conduit and are in communication with the interior chamber 54 of the hollow conduit. A source of pressurized air (not shown) is provided and, by means of an outlet pipe 55, provides the interior of conduit 52 with pressurized air. This air is ejected through the slot or slots 53 under great force, thereby providing an air cushion for the hollow body 2′. The upper bearing is stationary due to the flanges 50 and 51.

The lower bearing is of identical construction and accordingly the same reference numerals have been used. However, since this is a sliding bearing, the flanges 50 and 51 are omitted from this lower bearing.

It will be understood that the above description of the present invention is susceptible to various modifications, changes, and adaptations, and the same are intended to be comprehended within the meaning and range of equivalents of the appended claims.

What is claimed is:

1. A device for forming sections of a material, comprising, in combination:
  (a) an elongated hollow body having an axis and mounted for rotation about said axis which is vertically disposed;
  (b) an annular saw blade mounted on and coaxially with said hollow body for rotation therewith, said blade being at the upper end of said body;
  (c) a vertically positioned sleeve disposed coaxially with and interiorly of said hollow body and being stationary when said body is rotating and below said blade for accommodating sections which are cut off from a workpiece fed into the opening in said annular saw blades; and
  (d) means for flushing cut sections out of said sleeve and including a liquid which is directed toward said saw blade for lubricating and cooling said blade and bores formed about the entire circumference of said sleeve at the upper end thereof, said bores being directed toward the underside of said blade, and an annular lubricating agent feeding line disposed about and in communication with said bores.

2. A device for forming sections of a material, comprising, in combination:
  (a) an elongated hollow body having an axis and mounted for rotation about said axis which is vertically disposed;
  (b) an annular saw blade mounted on and coaxially with said hollow body for rotation therewith;
  (c) a vertically positioned sleeve disposed coaxially with and interiorly of said hollow body and being stationary when said body is rotating and below said blade for accommodating sections which are cut off from a workpiece fed into the opening in said annular saw blade, said blade being at the upper end of said body and positioned so that the upper end of said sleeve is substantially closed by the saw blade;
  (d) means for flushing cut sections out of said sleeve and including a liquid which is directed toward said saw blade for lubricating and cooling said blade; and
  (e) means for separating lubricating agent from the sections and closing off the lower end of said sleeve, said separating means including a section removing device having a foraminous plate, an outlet for removing lubricating agent, and suction means for drawing off any agent which is in the form of a mist.

3. A device for forming sections of a material, comprising, in combination:
  (a) an elongated hollow body having an axis and mounted for rotation about said axis which is vertically disposed;
  (b) an annular saw blade mounted on and coaxially with said hollow body, for rotation therewith;
  (c) a vertically positioned sleeve disposed coaxially with and interiorly of said hollow body and being stationary when said body is rotating and below said blade for accommodating sections which are cut off from a workpiece fed into the opening in said annular saw blade;
  (d) means for flushing cut sections out of said sleeve;
  (e) bearing means in which said body is mounted and including an upper ball bearing in which said hollow body is fixedly mounted and a lower bearing in which said body is slidingly mounted; and
  (f) a plurality of means for collecting oil located in said body and at said bearings and each including a ratchet wheel and a collecting trough.

4. A device for forming sections of a material, comprising, in combination:
  (a) an elongated hollow body having an axis and mounted for rotation about said axis which is vertically disposed;

(b) an annular saw blade mounted on and coaxially with said hollow body, for rotation therewith;

(c) a vertically positioned sleeve disposed coaxially with and interiorly of said hollow body and being stationary when said body is rotating and below said blade for accommodating sections which are cut off from a workpiece fed into the opening in said annular saw blade;

(d) means for flushing cut sections out of said sleeve; and (e) bearing means in which said body is mounted and including an upper ball bearing in which said hollow body is fixedly mounted and a lower bearing in which said body is slidingly mounted, a bearing of said body being an air-cushion bearing.

5. A device for forming sections of a material, comprising, in combination:

(a) an elongated hollow body having an axis and mounted for rotation about said axis which is vertically disposed;

(b) an annular saw blade mounted on and coaxially with said hollow body for rotation therewith, said body including a ring for clamping said blade thereto and having metal plates projecting therefrom;

(c) a vertically positioned sleeve disposed coaxially with and interiorly of said hollow body and being stationary when said body is rotating and below said blade for accommodating sections which are cut off from a work piece fed into the opening in said annular saw blade;

(d) means for flushing cut sections out of said sleeve;

(e) a plurality of separating means for separating the contaminated lubricating agent in the form of a liquid and any lubricating agent in the form of a mist from the sections; and (f) a hood disposed about said plates.

References Cited by the Examiner

UNITED STATES PATENTS

| | | | |
|---|---|---|---|
| 1,063,789 | 6/1913 | Gorton | 82—100 X |
| 1,994,178 | 3/1935 | Raiche | 29—952 X |
| 2,596,062 | 5/1952 | Abbey | 82—71 |
| 2,683,303 | 7/1954 | Pigott | 82—900 X |
| 2,713,339 | 7/1955 | Sayers | 125—15 |
| 3,001,562 | 9/1961 | Anderson | 146—43 |
| 3,024,687 | 3/1962 | Brownstein | 82—100 X |
| 3,078,749 | 2/1963 | Maxner | 82—70.2 |

WILLIAM W. DYER, JR., *Primary Examiner.*

RICHARD H. EANES, JR., *Examiner.*